H. H. DAVIS.
BAKING PAN.
APPLICATION FILED JUNE 7, 1918.

1,307,962.

Patented June 24, 1919.
2 SHEETS—SHEET 1.

Inventor
H. H. Davis

Witnesses

By Victor J. Evans
Attorney

H. H. DAVIS.
BAKING PAN.
APPLICATION FILED JUNE 7, 1918.
1,307,962.
Patented June 24, 1919.
2 SHEETS—SHEET 2.
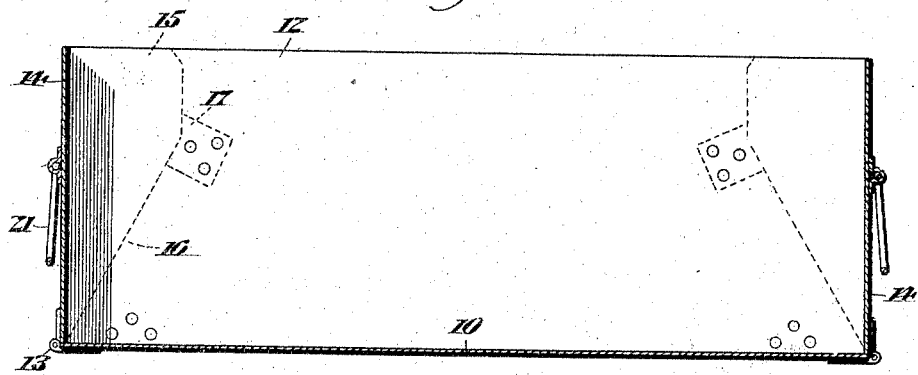
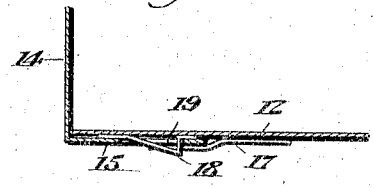
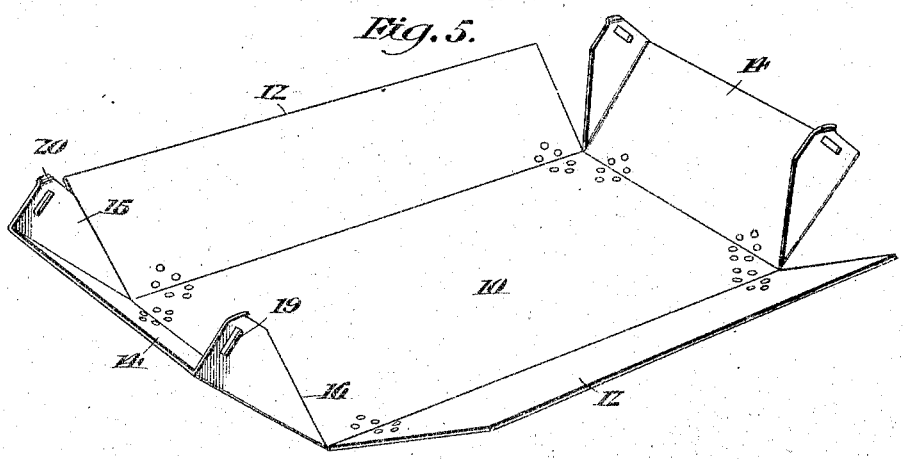
Witnesses
Inventor
H. H. Davis
By Victor J. Evans
Attorney

000000# UNITED STATES PATENT OFFICE.

HURLEY H. DAVIS, OF KIRKLAND, WASHINGTON.

BAKING-PAN.

1,307,962.

Specification of Letters Patent. Patented June 24, 1919.

Application filed June 7, 1918. Serial No. 238,759.

*To all whom it may concern:*

Be it known that I, HURLEY H. DAVIS, a subject of the King of Great Britain, residing at Kirkland, in the county of King and State of Washington, have invented new and useful Improvements in Baking-Pans, of which the following is a specification.

This invention relates to baking pans and aims to provide a pan so constructed and arranged that the contents may be easily removed after baking and without danger of breaking or otherwise damaging its appearance.

The invention therefore comprehends the provision of a pan including a bottom having side and end walls hingedly secured thereto in a manner to permit of their being folded outwardly or away from the pan, the end walls carrying at each end thereof an end flange adapted to overlap the adjacent ends of the side walls for sliding engagement beneath the tongue carried by the side walls, a locking lug which is also carried by the side wall engaging a slot in the flange to prevent accidental withdrawal of the latter from beneath the tongue.

The invention also includes the following novel construction, combination and arrangement of parts to be hereinafter more fully described and illustrated in the accompanying drawings, in which:—

Fig. 3 is a sectional view on the line 3—3 of Fig. 1;

Fig. 4 is a fragmentary sectional view on the line 4—4 of Fig. 1; and

Fig. 5 is a perspective view showing the side and end walls partly unfolded or opened.

Referring to the drawings in detail, like characters of reference denote corresponding parts throughout the several views.

Figure 1:
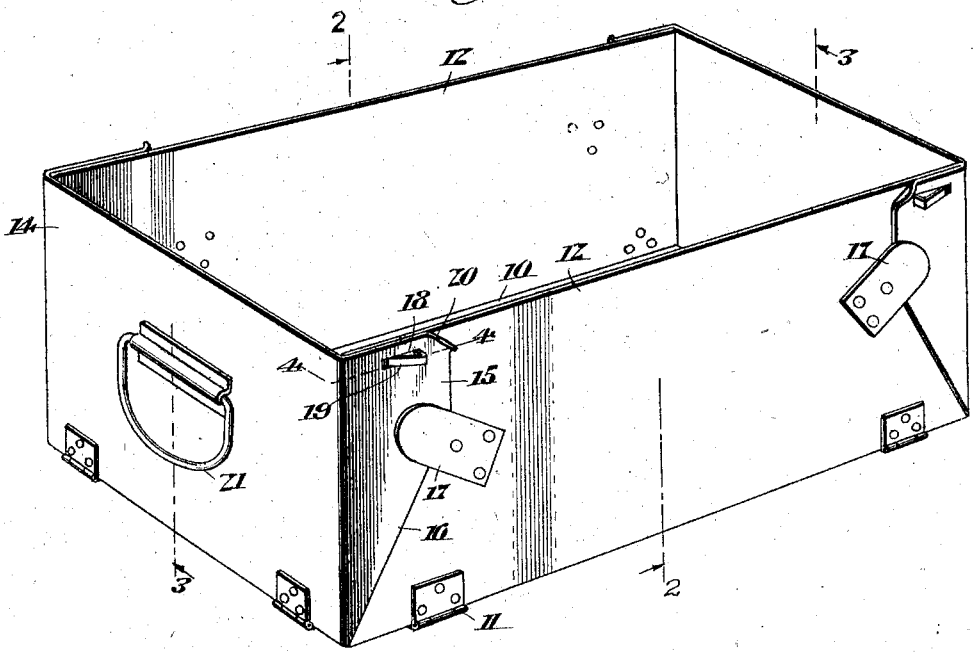
Figure 1 is a perspective view of a baking pan constructed in accordance with the present invention.
Figure 2:
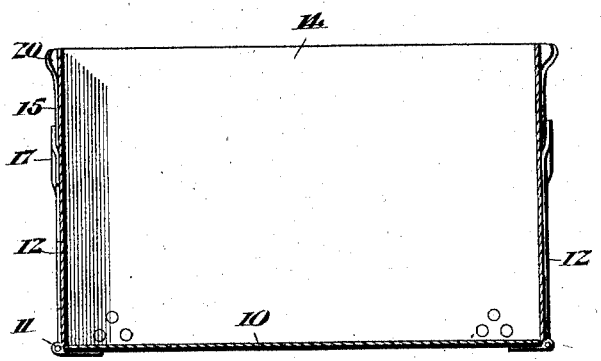
Fig. 2 is a transverse sectional view of the same on the line 2—2 of Fig. 1.

The invention as herein illustrated and described includes a bottom 10, to which is hingedly secured along the side edges thereof as shown at 11, the side walls 12. Also hinged to the bottom 10 at each end thereof as indicated at 13 are end walls 14, the side walls and end walls being adapted to fold at right angles to the bottom when the pan is in use and being capable of folding outwardly and downwardly to permit of the removal of the contents of the pan and for the purpose of cleaning the same.

The end walls carry at each end thereof end flanges 15, which are preferably formed integral with the walls 14 and are disposed at right angles thereto. The end flanges are adapted to overlap the adjacent ends of the side walls 12 and extend along the side walls for an appreciable distance near the top edge thereof, the bottom corners of the flange being cut away as shown at 16. The flanges 15 are received beneath engaging tongues 17, the latter being secured at one end to the side walls 12, while their opposite ends are free so that the end flanges 15 may be positioned between the tongues and the side walls 12.

In order to prevent the accidental withdrawal of the flanges 15, the side walls 12 have located at each end thereof laterally projecting elements 18. These elements may be in the form of lugs projecting from the side walls, or they may be in the form of triangular frames projecting from the said side walls with their faces disposed inwardly and their altitudes located adjacent the ends of the pan, so as to form cam surfaces for the edges of the flanges 15 to ride over and abutment shoulders for engagement with the face of slots 19 formed in the said end flanges. To facilitate the disengagement of the end flanges from the element 18, each of the said flanges is provided with an outwardly turned lip 20 so as to permit the finger or thumb to be inserted behind the flanges to move the same from engagement with the said element. The end walls 14 may be provided with the usual pivoted bails 21 to form handles as is usual in the use of this type.

The invention is susceptible of various changes in its form, proportions and minor details of construction and the right is herein reserved to make such changes.

Having described the invention, what is claimed is:—

1. A baking pan comprising a bottom, side walls and end walls hinged to said bottom, end flanges located at each end of the end walls and adapted to overlap the adjacent ends of the side walls, tongues carried by the side walls for overlapping engagement with each of the side flanges, and means for preventing the accidental withdrawal of the end flanges from beneath the said tongues.

2. A baking pan comprising a bottom, side walls and end walls hinged to said bottom, end flanges located at each end of the end walls and adapted to overlap the adjacent ends of the side walls, tongues having one end secured to the side walls and their opposite free end disposed toward the end of the pan for overlapping engagement with each of the side flanges and means for preventing the accidental withdrawal of the end flanges from beneath said tongues.

3. A baking pan comprising a bottom, side walls and end walls hinged to said bottom, end flanges located at each end of the end walls and adapted to overlap the adjacent ends of the side walls, tongues carried by the side walls for overlapping engagement with each of the side flanges and laterally extending elements engageable with the end flanges for preventing the accidental withdrawal of the end flanges from beneath said tongues.

4. A baking pan comprising a bottom, side walls and end walls hinged to said bottom, end flanges located at each end of the end walls and adapted to overlap the adjacent ends of the side walls, tongues carried by the side walls for overlapping engagement with each of the side flanges and laterally extending lugs carried by the side walls and engageable in slots provided in the end flanges for preventing the accidental withdrawal of the end flanges from beneath said tongues.

In testimony whereof I affix my signature.

HURLEY H. DAVIS.

Copies of this patent may be obtained for five cents each, by addressing the "Commissioner of Patents, Washington, D. C."